Jan. 19, 1937. J. A. CONRADY 2,068,398

REFRIGERATING DEVICE

Filed Feb. 19, 1936

INVENTOR.
JOHN A. CONRADY.
BY Allen & Allen
ATTORNEYS.

Patented Jan. 19, 1937

2,068,398

UNITED STATES PATENT OFFICE 2,068,398

REFRIGERATING DEVICE

John A. Conrady, Cincinnati, Ohio, assignor to The Crosley Radio Corporation, Cincinnati, Ohio, a corporation of Ohio Application February 19, 1936, Serial No. 64,755

5 Claims. (Cl. 62—120)

My invention relates to improvements in the structure shown and described, for example in the patent to R. T. Smith dated June 23, 1931, No. 1,811,523, and generally to portable ball type absorption refrigeration devices.

The object of the invention is to provide for a positive cooling of the upper portion of the ball and preferably also the liquid seal and dehydration liquid in the passage from the generator to the evaporator, during the generation cycle of the device.

In the patent above noted some of the liquid in the system is permitted to accumulate in a dome arranged on top of the generator ball, for a similar purpose, but I find that under certain circumstances this liquid becomes too hot during the generation step. To that end I provide for an independent supply of liquid, usually water, which by a thermo-syphon action from the cooling medium used in condensation, acts to cause a more active and effective dehydration.

I have illustrated in the drawing several arrangements whereby I provide for thermo-syphon dehydration in units of the type indicated, and will specifically describe these arrangements, it being understood that the novelty inherent therein will be set forth in the appended claims to which reference is hereby made.

In the drawing:—

Figure 1:
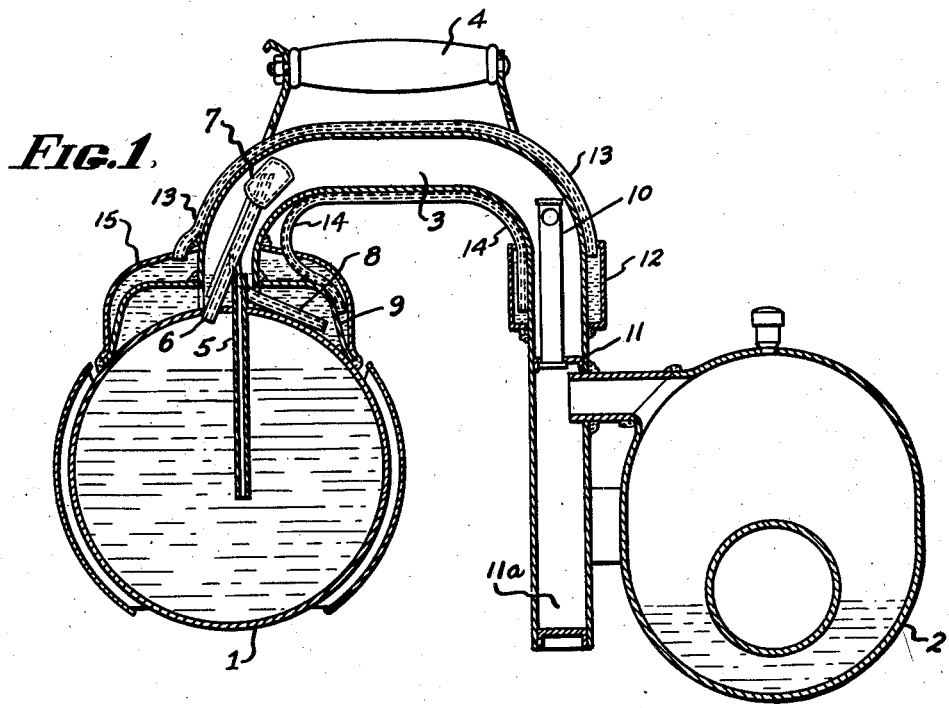
Fig. 1 is a cross section taken through a refrigeration unit of the portable absorption type.

The portable absorption refrigeration device which I have used for illustration of my invention consists of a generator-absorber ball 1, a condenser-evaporator ball 2, and a main connecting tube 3 between them, having a handle 4 for manipulation. In the device as shown the influx to the generator absorber from the connecting tube during the evaporation-absorption portion of the cycle, is through a tube 5, which establishes also the level of the liquid seal for controlling the cyclical operation of the device.

The exflux of gases from the generator-absorber, during the generation step is through a tube 6 which in the particular device illustrated extends to a small closed shell 7 within the connecting tube, thence back again through a tube 8 to a point in the connecting tube just above the top of the generator-absorber, and beneath the level of liquid established by the tube 5.

According to the invention of the Smith patent to which I have referred, the top of the generator-absorber ball or shell is provided with a domelike shell 9, termed a dome, which communicates with the interior of the end of the connecting tube 3. This dome naturally contains liquid from the system, and hence acts to keep the top of the generator absorber cool and the liquid seal cool. As a result dehydration occurs of the gases evolved while heating the generator absorber.

The evaporator end of the tube 3 in the structure illustrated contains a second dehydration element in the form of a tube 10 extending upwardly from a closure 11 across the tube 3. There will be an accumulation of liquid around this tube, which also serves a dehydration purpose. The condenser-evaporator shell is connected to the connecting tube 3 as shown with the tube extending down further to form a sump 11 for collection of liquid which might otherwise be condensed in the condenser evaporator, and interfere with the action of the device.

The full device has been described which is shown in the Smith patent, although my invention has wider application.

In the first illustrated form it consists in a closed sleeve or shell 12, which surrounds the connecting tube 3 near enough to the condenser-evaporator, so that the cooling medium applied to it during the generation portion of the cycle will cool a liquid housed within said shell. From this shell tubes 13 and 14 extend, preferably in close proximity and supported by the connecting tube, and preferably on the outside thereof. The tube 13 extends from the top of the shell and the tube 14 from the bottom thereof.

Mounted around the dome on the generator-absorber is a shell 15, forming a liquid retaining space over the top of the dome and preferably extending far enough to surround the end of the connecting tube and hence act on the liquid seal maintained therein. The tubes 13 and 14 extend into this shell, the tube 13 to the top thereof and the tube 14 to the bottom thereof.

As so arranged when the device is arranged for the generation step, with a flame applied to the generator and the condenser immersed in water or other cooling medium, the shells and tubes being filled with water or other liquid, will operate as follows:—the warmer water from the shell 15 will flow through the tube 13 to the shell 12, and cool water cooled by the cooling medium for the condenser, will flow back through the tube 14 to the shell 15. In this way the gases generated from the generator will be cooled and hence dehydrated more effectively at the several noted points.

Figure 2:
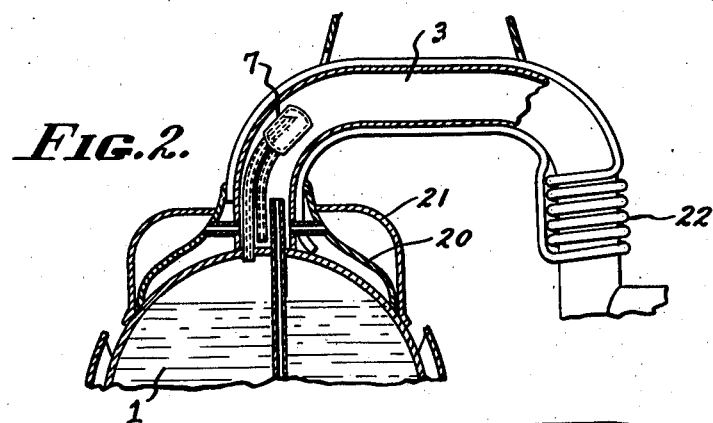
Fig. 2 is a like section of the parts essential to my invention, showing a modified form in which the thermo-syphon shell is placed inside of the dome on the generator ball.

If it is desired to use the dome it may be so arranged as to lie outside of the shell of the thermo-syphon cooling device. This is shown in Fig. 2 wherein the dome is shown at 20, and the shell corresponding to the shell 15, is shown at 21. In this instance also I have shown instead of the shell 12, a coil 22 of tubing which takes the place thereof.

Figure 3:
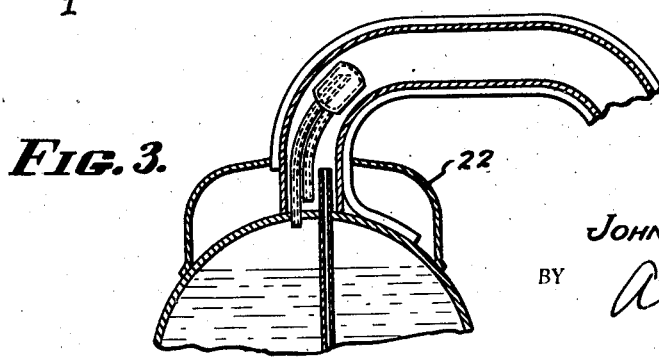
Fig. 3 is a like section showing the construction where the dome is omitted from the top of the ball, its service being accomplished by the thermo-syphon shell.

Instead of using the dome, the shell 15 can be used to do all of the cooling and hence dehydration. This is illustrated in Fig. 3 in which the shell 22 corresponding to the shell 15 is used alone, without the dome.

It will not be necessary to repeat the operation of the thermo-syphon system in connection with these modifications.

It should be noted that the tubes 13 and 14 could be placed inside of the connecting tube, if not made of copper, and that actual subjection of the liquid in the shell 12 to cooling medium is not necessary for the functioning of the device in an advantageous way over the Smith disclosure, since the shell 12 is out of the way of any direct communication of heat from the generator-absorber ball during the generation step. The shell could be in the form of a coil both at the generator end of the connecting tube and at the evaporator end.

Having thus described my invention, what I claim as new and desire to secure by Letters Patent is:—

1. In an absorption system refrigeration device, the combination of a generator-absorber, a condenser-evaporator, and conduit means between them, a dehydration device comprising a member surrounding the conduit means adjacent the condenser-evaporator, a liquid containing member at the top of the generator-absorber, and interconnecting passages between said members, whereby when filled with a liquid, a thermo-syphon action will be set up causing liquid collected at the condenser-evaporator end of the system to flow through the member on top of the generator absorber, for the purpose described.

2. Means for cooling the outlet from the generator-absorber of an absorption system refrigeration unit, comprising a liquid containing member about the outlet of the generator absorber, and a thermo-syphon system for maintaining a liquid cool in the said member during the application of heat to the generator-absorber.

3. In a portable absorption refrigeration unit, the combination of a generator-absorber shell, and a condenser evaporator shell, a conduit extending between them, means for maintaining a body of liquid in that portion of the conduit lying at the top of the generator absorber, means for causing gases evolved from the generator absorber to bubble through said body of liquid, and means for cooling the said body of liquid comprising a liquid container surrounding in part at least the conduit wherein said liquid is located, a liquid container located about said conduit at a point near the condenser evaporator, and ducts extending between said containers whereby a thermo-syphon action is set up between them during the step of heating the generator absorber shell.

4. In a portable absorption refrigeration unit, the combination of a generator-absorber shell, and a condenser evaporator shell, a conduit extending between them, means for maintaining a body of liquid in that portion of the conduit lying at the top of the generator absorber, means for causing gases evolved from the generator absorber to bubble through said body of liquid, and means for cooling the said body of liquid comprising a shell surrounding in part at least the conduit wherein said liquid is located, a liquid container located about said conduit at a point near the condenser evaporator, and ducts extending between said shell and container whereby a thermo-syphon action is set up between them during the step of heating the generator absorber shell, and an additional shell located about the top of the generator absorber and communicating with the body of liquid within the conduit, but not with the shell forming part of the thermo-syphon system, said additional shell also cooled by the latter.

5. In a portable absorption refrigeration unit, the combination of a generator-absorber shell, and a condenser evaporator shell, a conduit extending between them, means for maintaining a body of liquid in that portion of the conduit lying at the top of the generator absorber, means for causing gases evolved from the generator absorber to bubble through said body of liquid, and means for cooling the said body of liquid comprising a shell surrounding in part at least the conduit wherein said liquid is located, a liquid container located about said conduit at a point near the condenser evaporator, and ducts extending between said shell and container whereby a thermo-syphon action is set up between them during the step of heating the generator absorber shell and an additional shell located about the top of the generator absorber, and communicating with the said body of liquid, said additional shell lying inside of but not communicating with the said shell forming part of the thermo-syphon system.

JOHN A. CONRADY.